(12) United States Patent
Manapragada

(10) Patent No.: US 12,511,044 B2
(45) Date of Patent: Dec. 30, 2025

(54) FAST DECODING OF COMPRESSED DATA

(71) Applicant: Rivos Inc., Santa Clara, CA (US)

(72) Inventor: Sai Krishna Manapragada, Austin, TX (US)

(73) Assignee: Rivos Inc., Santa Clara, CA (US)

( * ) Notice: Subject to any disclaimer, the term of this patent is extended or adjusted under 35 U.S.C. 154(b) by 0 days.

(21) Appl. No.: 18/830,072

(22) Filed: Sep. 10, 2024

(65) Prior Publication Data

US 2025/0085852 A1 Mar. 13, 2025

Related U.S. Application Data

(60) Provisional application No. 63/581,680, filed on Sep. 10, 2023.

(51) Int. Cl.
*G06F 3/06* (2006.01)

(52) U.S. Cl.
CPC .......... *G06F 3/0608* (2013.01); *G06F 3/0655* (2013.01); *G06F 3/0673* (2013.01)

(58) Field of Classification Search
CPC .... G06F 3/0608; G06F 3/0655; G06F 3/0673; G06F 16/1744; G06F 2212/401; H03M 7/40; H03M 7/30; H03M 7/3059; H03M 13/235; H03M 7/6005
USPC .............. 711/154; 709/247; 710/68
See application file for complete search history.

(56) References Cited

U.S. PATENT DOCUMENTS

| | | | | |
|---|---|---|---|---|
| 2015/0358190 | A1* | 12/2015 | Kruglick | H04W 4/18 370/328 |
| 2020/0249948 | A1* | 8/2020 | Giamei | G06F 9/3552 |
| 2025/0004638 | A1* | 1/2025 | Abali | G06F 3/0604 |

* cited by examiner

*Primary Examiner* — Hashem Farrokh
(74) *Attorney, Agent, or Firm* — Brake Hughes Bellermann LLP

(57) ABSTRACT

Techniques described herein relate to methods for decompressing a compressed data stream. An example method includes reading groups of data from the compressed data stream and, for each group of data read from the compressed data stream, identifying symbols in the group of data, the symbols having a type corresponding to Literal bytes or Copy bytes of data in the compressed data stream, processing each symbol in one of a plurality of processing stream to produce decompressed data bytes, the processing stream used to process the symbol being selected according to the symbol's type, and merging the uncompressed data bytes from the different processing streams into a decompressed output data stream, where the uncompressed data bytes from the different processing streams are merged to preserve their order corresponding to an order or corresponding symbols in the compressed data stream.

8 Claims, 4 Drawing Sheets

FAST DECODING OF COMPRESSED DATA

CROSS-REFERENCE TO RELATED APPLICATION

This applications benefit, under 35 U.S.C. § 119, or U.S. Provisional Patent Application No. 63/581,680, filed on Sep. 10, 2023, entitled "FASTER DECODING", the disclosure of which is incorporated by reference herein in its entirety.

TECHNICAL FIELD

The present description generally relates to electronic data processing, and more particularly, to fast decoding of compressed data.

BACKGROUND

Computing and network systems rely on the use of compressed data to meet the demands of data storage and delivery. In general, compression processes may be used to reduce the size of data without loss of information contained within the data. However, data consumers must decompress the compressed files before using the data. Conventional decompression methods generally employ serial sequential execution of discrete decompression steps until all of the data is decompressed. Such techniques incur significant resource and time costs, particularly for large files. Accordingly, data decompression techniques are needed that are capable of providing fast, efficient, and accurate decompression results.

SUMMARY

In a general aspect, the techniques described herein relate to methods for decompressing a compressed data stream. An example method includes reading groups of data from the compressed data stream and, for each group of data read from the compressed data stream, identifying symbols in the group of data, the symbols having a type corresponding to Literal bytes or Copy bytes of data in the compressed data stream, processing each symbol in one of a plurality of processing stream to produce decompressed data bytes, the processing stream used to process the symbol being selected according to the symbol's type, and merging the uncompressed data bytes from the different processing streams into a decompressed output data stream, where the uncompressed data bytes from the different processing streams are merged to preserve their order corresponding to an order or corresponding symbols in the compressed data stream.

DETAILED DESCRIPTION

Figure 1:
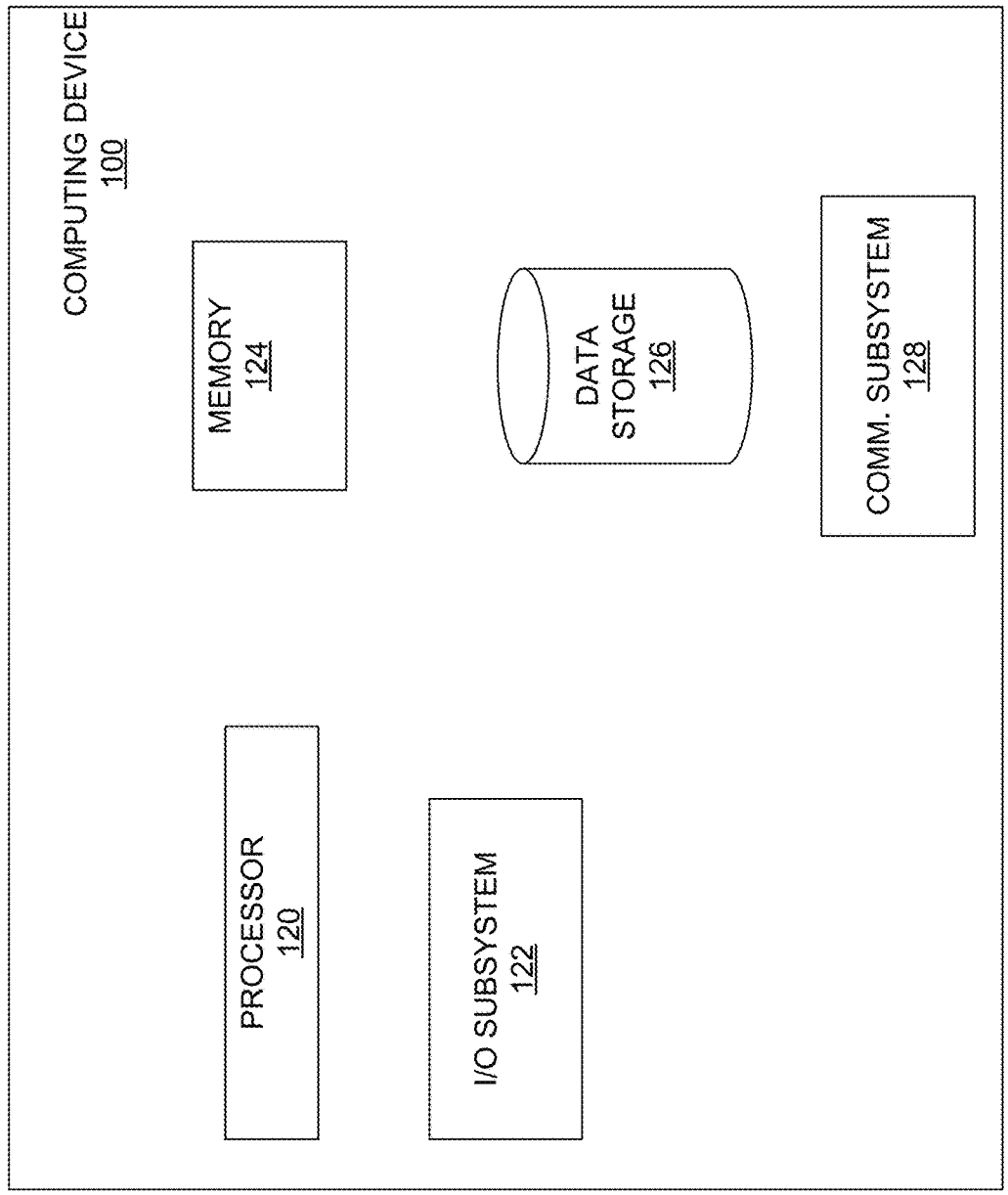
FIG. 1 is a block diagram of a computing device configured to perform efficient data decompression of an input compressed data stream.

In general, conventional decompression techniques involve very sequential processes of decoding symbols in a compressed data stream. Non-limiting examples of compression processes may include lossless data compression. Lempel-Ziv (LZ), LZ77, LZ4, LZFX, LZSS, Deflate, Snappy, Huffman encoding, compressed adaptive index (COMPAX), improved COMPAX (ICX), single-pass recompression (SPR), and/or the like, although implementations are not limited to these particular compression schemes. In particular, compression processes capable of operating according to some other implementations are comtemplated herein.

In general, the LZ77 compression process operates by replacing repeated occurrences of data with references to a single copy of that data existing earlier in the input (uncompressed) data stream. A match is encoded by a pair of numbers called a length-offset pair (where the "offset" may be also referred to as a "distance"). As such, the LZ77 compression process finds repeated substrings and replaces them with backward references (relative offsets). The LZ77 compression process can use a reference to a duplicated string if the relative offset is less than the maximal history size defined in the encoding algorithm. The compressed data consists of a series of elements of two types: literal bytes and pointers to replicated strings (i.e., copies of previously received data), where a pointer is represented as a pair <length, backward offset>. The various algorithms in the LZ77 family all find LZ77 string matches during compression but may encode the literals or copies differently and may have different maximal history windows. In general, a literal may include raw encoded data (as opposed to data encoded as a length, offset pair).

To identify matches, the LZ77 encoder keeps track of some amount of the most recent data, such as the last 2 kB, 4 kB, 32 kB, and/or the like. The structure in which this data is held is called a "sliding window" (accordingly, the LZ77 family of compression schemes is sometimes referred to as sliding window compression). The encoder keeps the most recent data within the sliding window to identify matches (and the decoder likewise will keep this data to interpret the matches the encoder refers to).

During LZ77 compression, bit patterns of a preceding (earlier or older) portion of a bit stream may be compared against a current portion (or current bit sequence) of the bit stream. If a sequence of bits is found in the current portion that matches a sequence of bits in the preceding portion (or preceding bit sequence), the sequence of bits in the current portion is replaced with a reference to the same sequence of bits in the earlier portion.

The reference that is inserted for the current bit sequence identifies the length of the current bit sequence and the location of the preceding bit sequence expressed, for instance, as an "offset" from the current bit sequence to the matching preceding bit sequence. As such, the LZ77 compression process encodes a bit sequence as a "length, offset pair" that is inserted in the bit stream in place of a current bit sequence. Upon decoding the compressed stream, when the decoder reaches the length, offset pair that is embedded in the bit stream, the decoder uses the offset part of the length, offset pair to refer back to the start of the matching bit sequence and reproduces the correct bit sequence of the decoded stream by reproducing a number of bits from the start of the matching bit sequence that is equal to the length component of the length, offset pair.

The Deflate compression process is used as the basis of various compression platforms, such as gzip/Zlib and Winzip/PKzip. In general, Deflate uses a series of blocks corresponding to successive blocks of input data. Each block may be compressed using a combination of the LZ77 compression process and Huffman coding. As described above, the LZ77 compression process operates to find repeated substrings and replaces the repeated substrings with references, such as relative offsets. The LZ77 compression process may use a reference to a duplicated string occurring in the same block or previous blocks, for instance, up to 32 KB previous input bytes. The compressed data may include a series of elements of two types: literal bytes and pointers to replicated strings (represented as the pair: <length, backward offset>. The LZ77 compression process operates to find string matches at each position.

In many systems, decompression latencies may be important to system performance. In general, conventional decompression may include sequential processes of decoding symbols in the compressed data stream. For example, the process of decompressing LZ77 streams has the following two phases: (1) decoding the input stream into tokens (literals or references to repeated strings) and (2) copying either the literal bytes or repeated strings (for example, with specified length and offset) to the output stream. In conventional formats, each token is typically of a variable size, making it impossible to know exactly where a subsequent token is without decoding and processing the first token. Therefore, conventional decoding is performed using a serial process, which is a fundamental limiter of performance when decompressing large files. This serial process can be accelerated in software implementations by various optimization means, but the nature does not depart from the inefficient process of serial sequential execution, which also limits the overall performance of the compression algorithm decompression process with the sliding window compression algorithms, such as LZ77.

Thus, to address these limitations, this document describes a parallel decompression process that may be performed to decompress portions of a compressed data file or data stream using a plurality of threads operating on the compressed data in parallel. For example, in some implementations, decompression information may be used in conjunction with a compressed file, with at least a portion of the decompression information providing indexing into regions of the compressed bit stream of the compressed file to enable the parallel processing of different pieces of information in the data stream. The parallel decompression process may access the decompression information and decompress the compressed file in parallel across a plurality of threads for fast, accurate, and efficient decompression of the data. In particular, a parallel decompression process may operate to increase the speed of decompression by, among other things, breaking up the sequential decompression process into multiple parallel tasks that may be executed in parallel. In addition, an on-chip cache can be used to store target data for use by the decompression processor, so that the access frequency of an off-chip memory is greatly reduced, and the access delay and the access bandwidth pressure are reduced. These parallel decompression processes according to some implementations may reduce the time required to decompress a compressed file by more than 10-fold compared with conventional decompression techniques.

FIG. 1 is a block diagram of a computing device 100 configured to perform efficient data decompression of an input compressed data stream. The computing device 100 includes a processor 120, an I/O subsystem 122, a memory 124, and a data storage device 126. The computing device 100 is configured to read symbols from the compressed input data stream, decode the symbols, and output decompressed data. As described herein, the computing device can process different symbols from the compressed data stream in a plurality of parallel threads to accelerate the decompression process and then to merge the outputs from the different threads to create the output decompressed data stream.

The computing device 100 may be any type of device capable of efficient data decompression and otherwise performing the functions described herein, for example, as a laptop computer, a notebook computer, a tablet computer, a smartphone, a mobile computing device, a computer, a desktop computer, a workstation, a server computer, a distributed computing system, a multiprocessor system, and/or any other computing device capable of efficient data decompression. In addition to the processor 120, the I/O subsystem 122, the memory 124, and the data storage device 126, the computing device 100 may include other or additional components, such as those commonly found in a computer. Additionally, in some implementations, one or more of the illustrative components may be incorporated in, or otherwise form a portion of, another component. For example, the memory 124, or portions thereof, may be incorporated in the processor 120 in some implementations.

The processor 120 can be embodied as a single or multi-core processor(s), digital signal processor, microcontroller, graphics processing unit, data processing unit, or other processor or processing/controlling circuit. Similarly, the memory 124 can be any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some implementations, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store compressed and/or decompressed data processed by the computing device 100.

The computing device 100 may also include a communication subsystem 128, which may be embodied as any communication circuit, device, or collection thereof, capable of enabling communications between the computing device 100 and other remote devices over a computer network (not shown). The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

Figure 2:
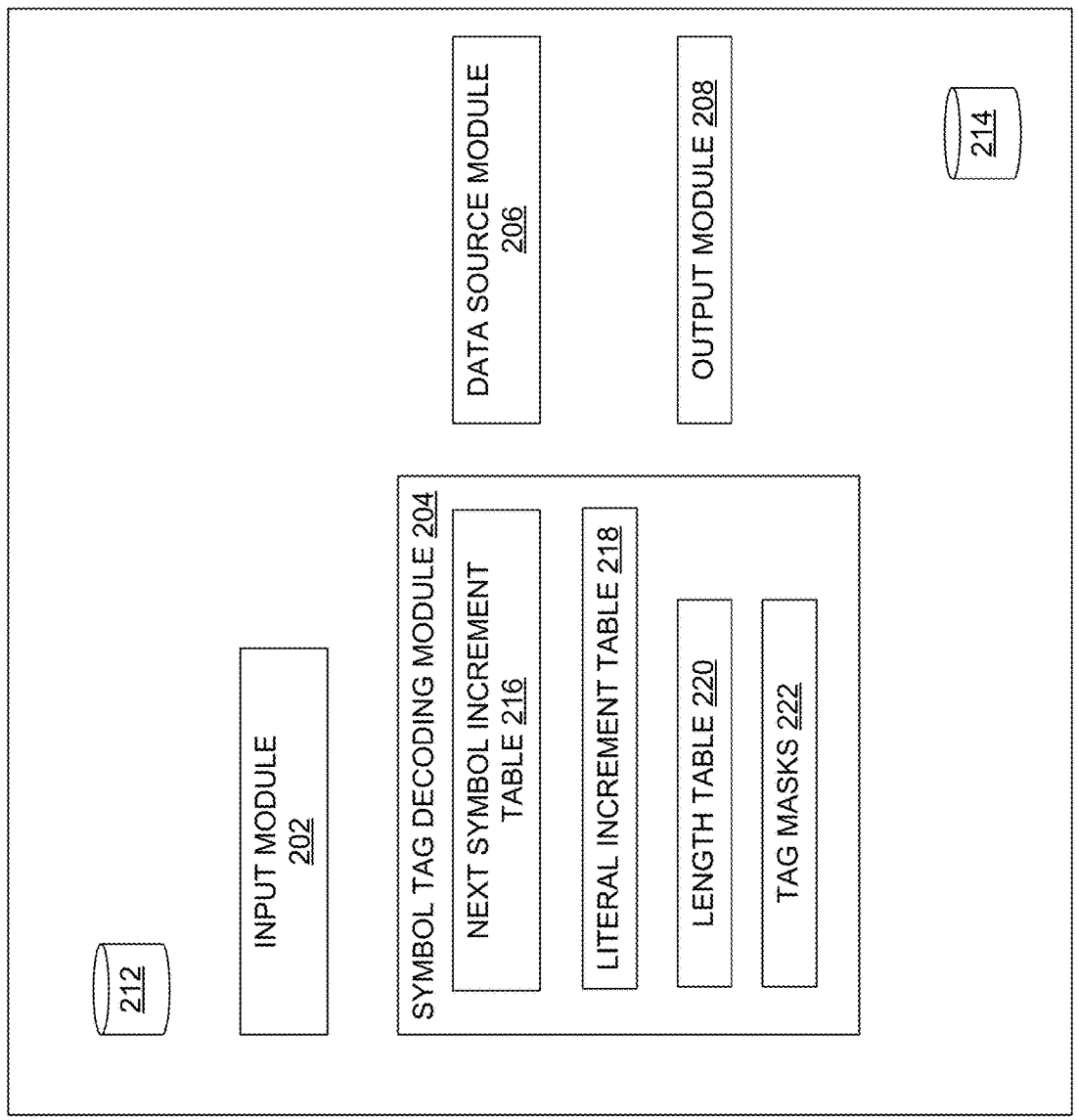
FIG. 2 is a block diagram of an implementation of computing device that includes an input module, a symbol tag decoding module, a data source module, and an output module.

FIG. 2 is a block diagram of an implementation of the computing device 100 in which the computing devices includes an input module 202, a symbol tag decoding module 204, a data source module 206, and an output module 208. In use, the computing device 100 is configured to read compressed data from an input stream 212, decode the compressed data, and write decompressed data to an output stream 214. The various modules of the environment 200 may be embodied as hardware, firmware, software, or a combination thereof. For example, the various modules, logic, and other components of the environment 200 may form a portion of, or otherwise be established by, the processor 120 or other hardware components of the computing device 100.

The input module 202 is configured to manage access to the input stream 212. The input module 202 is configured to open the input stream 212 and to read symbols and other data from the input stream 212. The input module 202 may maintain an input stream pointer that is used to access compressed data from the input stream 212. The input stream 212 may be embodied as any in-memory data structure that includes compressed data. The input stream 212 may be backed by or otherwise associated with a file, network connection, memory buffer, or any other source of compressed data.

The symbol tag decoding module 204 is configured to determine a next symbol increment value, a literal increment value, a data length, and an offset value based on a symbol tag value read by the input module 202. Each symbol may be a literal symbol or a copy symbol, and each symbol may occupy a variable number of bytes in the input stream 212. Literal symbols include literal data that is to be copied to the output stream 214 during decompression. Copy symbols refer to previously decompressed data that is to be copied to the output stream 214 during decompression, for example, by copying data that was previously copied to the output stream 214. The next symbol increment value may be used to identify the location in the input stream 212 of the beginning of the next symbol. The data length indicates how many bytes of data are to be copied, for both literal symbols and copy symbols. The literal increment value may be used to locate the start of literal data in the input stream 212, and the offset value may be used to locate the start of copy data in the output stream 214. In some implementations, the symbol tag decoding module 204 may be configured to determine the next symbol increment value, the literal increment, and the data length by indexing a next symbol increment table 216, a literal increment table 218, and a length table 220, respectively. The symbol tag decoding module 204 may be configured to determine tag masks 222 for data received from the input stream 212, where the tag mask is used to track the input symbol types (e.g., Literal, Copy from a short offset, Copy from a long offset), and when and by which processing stream they are processed during decoding operations by the computing device 100.

The data source module 206 is configured to maintain a source pointer used to access data to be copied to the decompressed output. The data source module 206 is configured to set the source pointer to point to literal data from the input stream 212 or to reference previously decompressed data from the output stream 214 based on the type of the current symbol (i.e., a literal symbol or a copy symbol).

The output module 208 is configured to manage access to the output stream 214. The output module 208 is configured to open the output stream 214 and write decompressed data to the output stream 214. The output module 208 is also configured to allow copying already-written data from the output stream 214, used to decompress copy symbols. The output module 208 may maintain an output stream pointer that may be used to read and/or write decompressed data from the output stream 214. The output stream 214 may be embodied as any in-memory data structure capable of storing and referencing decompressed data. The output stream 214 may be backed by or otherwise associated with a file, network connection, memory buffer, or any other destination for decompressed data.

Figure 3:
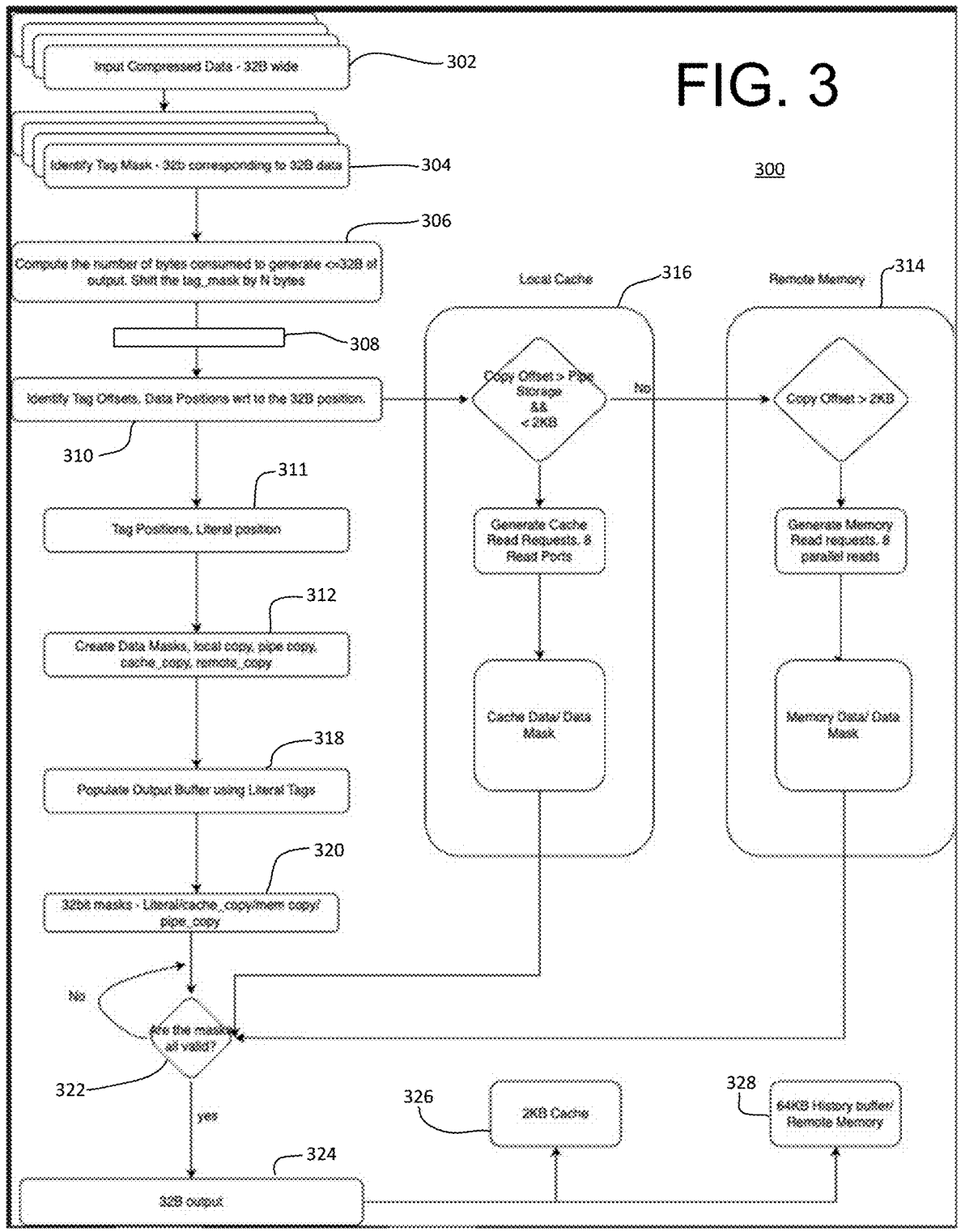
FIG. 3 is a flow chart of a process for parallel decoding of a compressed data stream.

FIG. 3 is a flow chart of a process 300 for parallel decoding of a compressed data stream. In the process 300, compressed data from a compressed data stream can be received in fixed-sized loads (302). For example, the compressed data can be received in 32 byte wide loads from a buffer. Then, a tag mask can be identified corresponding to the 32 bytes of data that is received (304). The tag mask can include 32 bits corresponding to the 32 bytes of received compressed data, and each bit of the tag mask can identify whether a corresponding byte of compressed data identifies a Literal or a Copy. Then, the number of bytes in the sequence of received bytes of compressed data stream that need to be consumed in a clock cycle to produce the most bytes, but less than or 32 bytes, of decompressed output data is calculated (306). The last byte of compressed data that needs to be consumed to produce this result is identified and tracked, and any remaining bytes from the 32 byte load are held in a FIFO buffer 308 for processing in a subsequent clock cycle.

For the bytes that are to be processed in a clock cycle to produce up to 32 bytes of decompressed output data, the offsets and data positions of the data to be copied into the output buffer (i.e., the offsets and data positions of the Literal and Copy data) are determined (310) and then flagged for processing by different processing streams. In addition, the tag positions and Literal positions of Literal data are determined (311).

Data masks are created to control and track the fetching of data from different processing streams (312). For example, data can be copied from a remote memory, from a cache memory, from a processing pipeline, and locally from the processor. As explained below, the data is copied from the different locations depending on the type of data (Literal or Copy) and depending on the offset value of the data.

For Copy data having an offset value above a first threshold value (e.g., 2 kB), the data may be read from a remote memory 314. The remote memory can store the Copy data in a memory bank at 8 byte intervals, and if more than 8 bytes of data needs to be read out of the remote memory, then the read request is split into multiple read requests. Returning data from the remote memory can take 6 or 7 clock cycles, e.g., two clock cycles to generate the read request and 4 or 5 clock cycles to return the data from remote memory.

For Copy data having an offset value below the first threshold value but above a second threshold value (e.g., 64 bytes), the data may be read from an on-chip cache memory 316. Returning data from the cache memory can take 3 clock cycles, e.g., two clock cycles to generate the read request and one clock cycle to return the data from cache memory.

For Copy data having an offset value below the second threshold value, the data may be read out of a data pipeline used by the processor that performs the decompression of the received data.

For Literal data, the data may be retrieved locally from the processor and inserted into an output buffer using the Literal tag for the data (318).

The 32 bit masks (320) corresponding to the 32 bytes of data loaded from the input from the input compressed data stream can be compared (322) to the data masks used to control and track the retrieval of Copy data from the local cache processing stream (316) and from the remote memory processing stream (314), and if the masks match, then any data retrieved from the local cache and remote memory processing streams can be inserted into the output data stream (324), along with the Literal and Copy data copied from the processing pipeline. Comparison of the masks ensures that the data from the different processing streams is inserted into the uncompressed output stream in their proper positions or orders. Portions of the output data stream that are to be used as Copy data for the decompression of subsequently received input compressed data can be stored in the local cache 326 and in a remote memory history buffer 328.

Up to 32 bytes of data can be output per clock cycle, for example, if all of the received 32 bytes of input compressed data corresponds to Literal data in the data stream. However, if Copy data is fetched from the remote memory, this may cause a bubble in the processing pipeline of Literal data while the arrival of data from the remote memory is awaited. Because of this, in practice, the average amount of output data per clock cycle may be somewhat less than 32 bytes. In some implementations, the average amount of output data per clock cycle can depend on the compression ratio used in the compression of the data. For example, a high compression ratio can result in relatively more data being read from the remote memory stream (314), such that the average amount of output data per clock cycle would be somewhat lower than if a lower compression ratio were used, such that fewer remote memory reads were performed. Using a 1.6 GHz clock rate processor to perform decompression of data compressed with a Snappy compression algorithm with a typical compression ratio, decompression rates of about 30 Gb/s were achieved with the techniques described herein.

Figure 4:
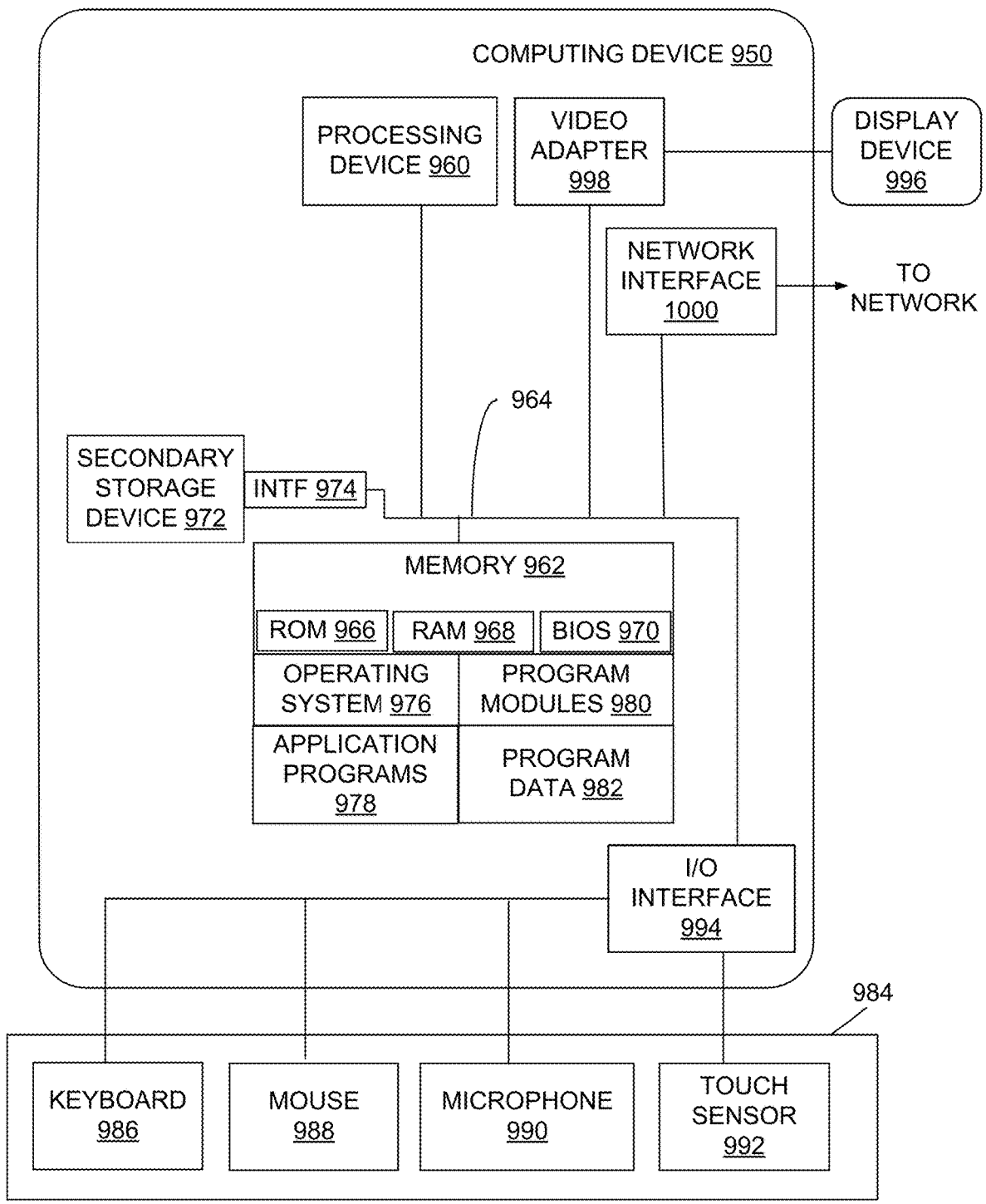
FIG. 4 is a schematic diagram of a computing device that can execute an operating system, application programs, and software modules, as described herein.

The computing device illustrated in FIG. 4 can be used to execute the operating system, application programs, and software modules described herein.

The computing device 950 includes, in some implementations, at least one processing device 960, such as a central processing unit (CPU). A variety of processing devices are available from a variety of manufacturers, for example, Intel or Advanced Micro Devices. In this example, the computing device 950 also includes a system memory 962, and a system bus 964 that couples various system components including the system memory 962 to the processing device 960. The system bus 964 is one of any number of types of bus structures including a memory bus, or memory controller; a peripheral bus; and a local bus using any of a variety of bus architectures.

Examples of computing devices suitable for the computing device 950 include a desktop computer, a laptop computer, a tablet computer, a mobile computing device (such as a smart phone, an iPod® or iPad® mobile digital device, or other mobile devices), or other devices configured to process digital instructions.

The system memory 962 includes read only memory 966 and random access memory 968. A basic input/output system 970 containing the basic routines that act to transfer information within computing device 950, such as during start up, is typically stored in the read only memory 966.

The computing device 950 also includes a secondary storage device 972 in some implementations, such as a hard disk drive, for storing digital data. The secondary storage device 972 is connected to the system bus 964 by a secondary storage interface 974. The secondary storage devices 972 and their associated computer readable media provide nonvolatile storage of computer readable instructions (including application programs and program modules), data structures, and other data for the computing device 950.

Although the example environment described herein employs a hard disk drive as a secondary storage device, other types of computer readable storage media are used in other implementations. Examples of these other types of computer readable storage media include magnetic cassettes, flash memory cards, digital video disks, Bernoulli cartridges, compact disc read only memories, digital versatile disk read only memories, random access memories, or read only memories. Some implementations include non-transitory computer-readable media. Additionally, such computer readable storage media can include local storage or cloud-based storage.

A number of program modules can be stored in secondary storage device 972 or system memory 962, including an operating system 976, one or more application programs 978, other program modules 980 (such as the software engines described herein), and program data 982. The computing device 950 can utilize any suitable operating system, such as Microsoft Windows™, Google Chrome™ OS or Android, Apple OS, Unix, or Linux and variants and any other operating system suitable for a computing device. Other examples can include Microsoft, Google, or Apple operating systems, or any other suitable operating system used in tablet computing devices.

In some implementations, a user provides inputs to the computing device 950 through one or more input devices 984. Examples of input devices 984 include a keyboard 986, mouse 988, microphone 990, and touch sensor 992 (such as a touchpad or touch sensitive display). Other implementations include other input devices 984. The input devices are often connected to the processing device 960 through an input/output interface 994 that is coupled to the system bus 964. These input devices 984 can be connected by any number of input/output interfaces, such as a parallel port, serial port, game port, or a universal serial bus. Wireless communication between input devices and the interface 994 is possible as well, and includes infrared, BLUETOOTH® wireless technology, 802.11a/b/g/n, cellular, ultra-wideband (UWB), ZigBee, or other radio frequency communication systems in some possible implementations.

In this example implementation, a display device 996, such as a monitor, liquid crystal display device, projector, or touch sensitive display device, is also connected to the system bus 964 via an interface, such as a video adapter 998. In addition to the display device 996, the computing device 950 can include various other peripheral devices (not shown), such as speakers or a printer.

When used in a local area networking environment or a wide area networking environment (such as the Internet), the computing device 950 is typically connected to the network through a network interface 1000, such as an Ethernet interface or WiFi interface. Other possible implementations use other communication devices. For example, some implementations of the computing device 950 include a modem for communicating across the network.

The computing device 950 typically includes at least some form of computer readable media. Computer readable media includes any available media that can be accessed by the computing device 950. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 950.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

What is claimed is:

1. A method of decompressing a compressed data stream, the method comprising:
    reading groups of data from the compressed data stream;
    for each group of data read from the compressed data stream:
        identifying symbols in the group of data, the symbols having a type corresponding to Literal bytes of data or Copy bytes of data in the compressed data stream;
        processing each symbol in one of a plurality of processing stream to produce decompressed data bytes, wherein the processing stream is used to process the symbol is selected according to the symbol's type; and
    merging the uncompressed data bytes from different processing streams of the plurality of processing streams into a decompressed output data stream having uncompressed data bytes, wherein the uncompressed data bytes from the different processing streams are merged to preserve their order corresponding to an order of corresponding symbols in the compressed data stream.

2. The method of claim 1, wherein the groups of data are read from the compressed data stream in a fixed-size load.

3. The method of any one of claim 1, further comprising identifying a tag mask corresponding to the fixed-size load.

4. The method of claim 3, wherein each bit of the tag mask identifies whether a corresponding byte of compressed data identifies a Literal byte of compressed data or a Copy byte of compressed data.

5. The method of claim 4, further comprising, for Copy data having an offset value above a first threshold value, reading the data out from a remote memory.

6. The method of claim 5, further comprising, for Copy data having an offset value below the first threshold value but above a second threshold value, reading the data out from an on-chip cache memory.

7. The method of claim 6, further comprising, for Copy data having an offset value below the second threshold value, reading the data may be read out of a data pipeline used by the processor that performs the decompression of the received data.

8. The method of claim 4, further comprising, for Literal data, reading the data out from a processor.

* * * * *